United States Patent [19]

Ridyard

[11] 3,926,946

[45] Dec. 16, 1975

[54] WATER SOLUBLE MONOAZO DYESTUFFS CONTAINING A DIPHENYLAMINE GROUP CARRYING A SULPHAMOYL SUBSTITUENT AND A SULPHO OR SULPHATO SUBSTITUENT

[75] Inventor: Denis Robert Annesley Ridyard, Manchester, England

[73] Assignee: Imperial Chemical Industries Limited, London, England

[22] Filed: Oct. 3, 1972

[21] Appl. No.: 294,608

[30] Foreign Application Priority Data
Oct. 12, 1971   United Kingdom............... 47452/71

[52] U.S. Cl................ 260/206; 260/205; 260/207; 260/207.1
[51] Int. Cl.²....................... C07C 107/06
[58] Field of Search ........ 260/207.1, 207, 206, 205, 260/207.3

[56] References Cited
UNITED STATES PATENTS

| | | | |
|---|---|---|---|
| 2,879,269 | 3/1959 | Merian................................ | 260/206 |
| 3,516,982 | 6/1970 | Dimroth et al. ................... | 260/207.1 |
| 3,535,306 | 10/1970 | Altermatt et al. ............... | 260/207.1 |
| 3,663,531 | 5/1972 | Licchti................................ | 260/206 |

FOREIGN PATENTS OR APPLICATIONS

| | | | |
|---|---|---|---|
| 158,260 | 3/1940 | Austria .............................. | 260/206 |
| 1,943,250 | 3/1970 | Germany ........................... | 260/207 |

Primary Examiner—Henry R. Jiles
Assistant Examiner—Robert W. Ramsuer
Attorney, Agent, or Firm—Cushman, Darby & Cushman

[57] ABSTRACT

Water-soluble monoazo dyestuffs for nylon which have the general formula:

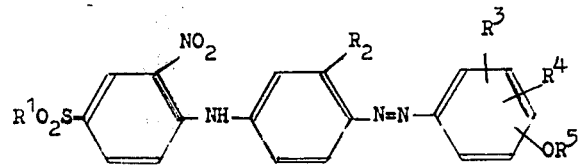

wherein $R^1$ represents hydroxyl, amino, alkylamino, dialkylamino, arylamino or sulphatoalkylamino, $R^2$ represents hydrogen, sulphamoyl, alkylsulphamoyl, arylsulphamoyl or sulpho, $R^3$ represents hydrogen, halogen, alkyl or alkoxy, $R^4$ represents hydrogen or alkyl and $R^5$ represents hydrogen, alkyl, acyl or arylsulphonyl, the —$OR^5$ group being in the 2- or 4- position relative to the azo group and substituents $R^1$ and $R^2$ being so chosen that the dyestuff contains a single optionally substituted sulphamoyl group and a single sulpho or sulphato group. The dyestuff can be used to dye synthetic polyamide textile materials. They have excellent levelling properties and give reddish-yellow colorations having a high degree of fastness to wet treatments and to light.

2 Claims, No Drawings

WATER SOLUBLE MONOAZO DYESTUFFS CONTAINING A DIPHENYLAMINE GROUP CARRYING A SULPHAMOYL SUBSTITUENT AND A SULPHO OR SULPHATO SUBSTITUENT

This invention relates to monoazo dyestuffs and their application to textile materials.

According to the invention there are provided water-soluble monoazo dyestuffs having the general formula:

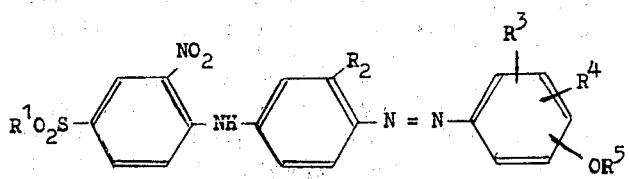

wherein $R^1$ represents hydroxyl, amino, mono (lower alkyl) amino, di(lower alkyl) amino, anilino or sulphatoethylamino, $R^2$ represents hydrogen, sulphamoyl, or sulpho, $R^3$ represents hydrogen, chlorine, lower alkyl or lower alkoxy, $R^4$ represents hydrogen or lower alkyl and $R^5$ represents hydrogen, lower alkyl, acetyl, benzoyl or p-toluenesulphonyl, the —$OR^5$ group being in the 2- or 4- position relative to the azo group and substituents $R^1$ and $R^2$ being so chosen that the dyestuffs contain only one sulphamoyl group and only one of a sulpho or sulphato group.

Examples of dyestuff structures of Formula I containing a single optionally substituted sulphamoyl group and a single sulpho or sulphato group include those wherein $R^1$ is hydroxyl and $R^2$ is sulphamoyl, alkylsulphamoyl or arylsulphamoyl, those wherein $R^1$ is amino, alkylamino, dialkylamino or arylamino and $R^2$ is sulpho and those wherein $R^1$ is sulphatoalkylamino and $R^2$ is hydrogen.

Halogen atoms which may be represented by $R^3$ include chlorine and bromine atoms. Alkyl groups which may be represented by $R^3$, $R^4$ and $R^5$ and alkoxy groups which may be represented by $R^3$ include lower alkyl and lower alkoxy groups, that is to say groups containing from one to four carbon atoms. Acyl groups which may be represented by $R^5$ include acetyl and benzoyl. Arylsulphonyl groups which may be represented by $R^5$ include benzenesulphonyl and p-toluenesulphonyl.

The dyestuffs of the invention may be prepared by diazotising an amine of the formula:

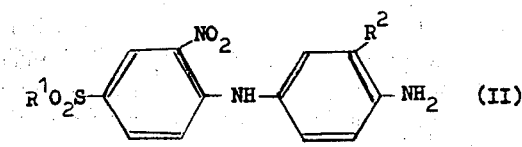

wherein $R^1$ and $R^2$ have the significances already stated, coupling the resulting diazo compound with a phenol of the formula:

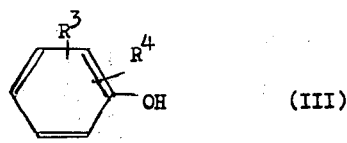

and, where necessary, converting the hydroxyl group to alkoxy, acyloxy or arylsulphonyloxy by known methods.

Amines of Formula II may be prepared by reacting, using well established methods, 2-nitrochlorobenzene-4-sulphonamide or the corresponding sulphonanilide and sulphonalkylamides with p-phenylene diamine sulphonic acid or by reacting 2-nitrochlorobenzene-4-sulphonic acid with p-phenylenediamine sulphonamide or the corresponding sulphonanilide and sulphonalkylamides. A third method of preparing amines of Formula II is to react 2-nitrochlorobenzene-4-sulphonethanolamide with p-phenylene diamine followed by sulphation of the resulting 4-amino-2'-nitrodiphenylamine-4'-sulphonethanolamides.

Suitable phenols of Formula III for use in making the dyestuffs of the invention include phenol, m-cresol, o-cresol, p-cresol, o-chlorophenol, 2,5-dimethylphenol, 6-chloro-3-methylphenol, 3,5-dimethylphenol, 2,6-dimethylphenol, 2-methoxyphenol, 3-methoxyphenol and 4-methoxyphenol.

The dyestuffs of the present invention are particularly suitable for applying to synthetic polyamide textile materials, for example nylon 66, nylon 6 and nylon 11, using any of the general methods known for the application of acid dyestuffs to such materials. The dyestuffs have excellent levelling properties and give reddish-yellow colorations having a high degree of fastness to wet treatments and to light.

The invention is illustrated but not limited by the following Examples in which all parts and percentages are by weight.

EXAMPLE 1

A solution of 16 parts of 4-amino-2'-nitro-4'-sulphonamido diphenylamine-3-sulphonic acid in 200 parts of water and 10 parts of 36% sodium hydroxide solution is stirred at 20°C and 25 parts of 2N sodium nitrite solution are added. The mixture is added with vigorous agitation during 20 minutes at 10°–15°C to 24 parts of 36% hydrochloric acid in 100 parts of water. After stirring for 1 hour at 10°–15°C the diazo suspension is added during 30 minutes at 10°–15°C to a stirred solution of 4 parts of phenol in 100 parts of water, 8 parts of 36% sodium hydroxide solution and 8 parts of sodium carbonate. Stirring is continued for a further 1 hour at 10°–15°C, the pH is adjusted to 7 with hydrochloric acid and the product is filtered off, washed with 5% brine solution and dried.

When applied to nylon 66 from a weakly acid bath, a strong reddish yellow shade is obtained which exhibits very good wet fastness and light fastness combined with excellent levelling.

In place of the 4 parts of phenol used in the example there may be used 4.3 parts of o-, m or p cresols when dyestuffs having similar properties are obtained.

EXAMPLE 2

A solution of 4.3 parts of the sulphuric ester of 4-amino-2'-nitrodiphenylamine-4'-sulphonethanolamide in 100 parts of water and 3 parts of 36% sodium hydroxide solution is stirred at 20°C and 5 parts of 2N sodium nitrite solution are added. The mixture is added with vigorous agitation during 15 minutes at 0°–5°C to 6 parts of 36% hydrochloric acid in 50 parts of water. After stirring at 0°–5°C for a further 2 hours the diazo suspension is added during 30 minutes at 0°–5°C to a stirred solution of 1 part of phenol in 50 parts of water, 2 parts of 36% sodium hydroxide solution and 2 parts of sodium carbonate. Stirring is continued for a further 3 hours at 0°–5°C, sodium chloride (10% W/V) is added and the precipitated dyestuff is filtered off, washed with 5% brine solution and dried.

When applied to nylon 66 fabric from a weakly acid bath, a strong reddish-yellow shade is obtained which exhibits good fastness to wet treatments combined with excellent levelling properties and light fastness.

The sulphuric ester of 4-amino-2'-nitrodiphenylamine-4'-sulphonethanolamide used in this example may be obtained as follows: 2-nitrochlorobenzenesulphonylchloride is reacted with ethanolamine and the resulting 2-nitrochlorobenzenesulphonethanolamide is condensed with p-phenylenediamine in boiling 50% aqueous ethanol followed by sulphation of the resulting 2-nitro-4'-aminodiphenylamine-4-sulphonethanolamide in 98% sulphuric acid at 0°–5°C.

In place of the 1 part of phenol used in this Example there may be used 1.2 parts of o, m or p cresols when dyestuffs having similar properties are obtained.

The following Table gives further Examples of dyestuffs of the invention which may be obtained by diazotising the amines listed in the second column and coupling under alkaline conditions with the phenolic compounds listed in the third column.

EXAMPLE 17

20 Parts of diethylsulphate are added to a solution of 5 parts of the hydroxy dyestuff prepared as in Example 1 in 200 parts of water and 10 parts of 36% sodium hydroxide solution and the mixture is stirred and heated at reflux for 2 hours. The reaction mixture is cooled to 20°C and the product filtered off, washed with 5% brine solution and dried.

When applied to nylon 66 fabric from a weakly acid bath, a strong reddish-yellow shade is obtained which exhibits good fastness to wet treatments and to light.

EXAMPLE 18

If the 5 parts of hydroxy dyestuff in the above Example is replaced by 5 parts of the dyestuff prepared as in Example 2 a dyestuff with similar properties is obtained.

EXAMPLE 19

A solution of 5 parts of the hydroxy dyestuff prepared as in Example 1 in 100 parts of water and 3 parts of 36% sodium hydroxide solution is stirred at 80°C. 4 Parts of p-toluenesulphonylchloride are added and the mixture is stirred at 80°C for a further 2 hours before cooling to 20°C. The product is filtered off washed with 5% brine solution and dried.

When applied to nylon 66 fabric from a weakly acid bath, a strong reddish-yellow shade is obtained which exhibits good fastness to wet treatments and to light.

The following Table gives further examples of dyestuffs of the invention which may be obtained by diazotising the amines listed in the second column, coupling

| | | |
|---|---|---|
| 3 | 4-amino-2'-nitro-4'-sulphonamidodiphenylamine-3-sulphonic acid. | 3,5-dimethylphenol |
| 4 | '' | 2-chlorophenol |
| 5 | '' | 3-methoxyphenol |
| 6 | 4-amino-2'-nitro-3'-sulphodiphenylamine-4'-sulphonmethylamide. | phenol |
| 7 | 4-amino-2'-nitro-3-sulphodiphenylamine-4'-sulphondiethylamide. | '' |
| 8 | 4-amino-2'-nitro-3-sulphodiphenylamine-4'-sulphonanilide. | '' |
| 9 | '' | m-cresol |
| 10 | '' | 2,6-dimethylphenol |
| 11 | 4-amino-2'-nitrodiphenylamine-4'-sulphon ethanolamide sulphuric ester. | 3,5-dimethylphenol |
| 12 | '' | 2,6-dimethylphenol |
| 13 | '' | 3-methoxyphenol |
| 14 | 4-amino-2'-nitro-3-sulphonamidodiphenylamine-4'-sulphonic acid. | phenol |
| 15 | '' | o-cresol |
| 16 | '' | 2-methoxyphenol | under alkaline conditions with the phenolic compounds listed in the third column followed by reaction with alkylating or acylating agent listed in the fourth column.

| | | | |
|---|---|---|---|
| 20 | 4-amino-2'-nitro-3-sulphodiphenylamine-4'-sulphonethylamide. | phenol | dimethyl sulphate |
| 21 | '' | m cresol | ethyl chloride |
| 22 | 4-amino-2'-nitro-3-sulphodiphenylamine-4'-sulphondimethylamide. | o cresol | diethyl sulphate |
| 23 | '' | phenol | acetic anhydride |
| 24 | '' | '' | benzoyl chloride |
| 25 | '' | '' | p-toluene sulphonyl chloride. |
| 26 | 4-amino-2'-nitrodiphenylamine-4'-sulphonethanolamide sulphuric ester. | phenol | dimethyl sulphate |
| 27 | '' | p-cresol | ethyl chloride |
| 28 | '' | 3,5-dimethyl-phenol. | diethyl sulphate |
| 29 | '' | phenol | acetyl chloride |
| 30 | '' | '' | benzoylchloride |

We claim:
1. A water-soluble monoazo dyestuff having the formula:

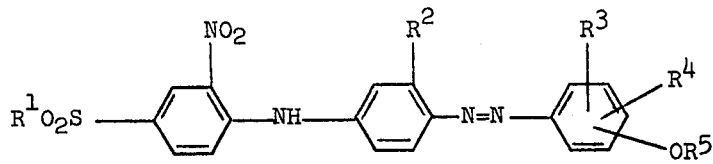

wherein
- $R^1$ represents hydroxyl, amino, mono(lower alkyl) amino, di(lower alkyl) amino, anilino or sulphatoethylamino,
- $R^2$ represents hydrogen, sulphamoyl or sulpho,
- $R^3$ represents hydrogen, chlorine, lower alkyl or lower alkoxy,
- $R^4$ represents hydrogen or lower alkyl and
- $R^5$ represents hydrogen, lower alkyl, acetyl, benzoyl or p-toluenesulphonyl, the $-OR^5$ group being in the 2- or 4-position relative to the azo group and substituents $R^1$ and $R^2$ being so chosen that the dyestuff contains only one sulphamoyl and only one of sulpho or sulphato.

2. A water-soluble monoazo dyestuff as claimed in claim 1 which has the structure:

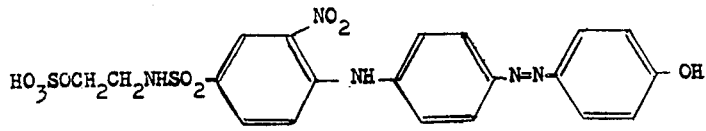

* * * * *